United States Patent
Haubenschild et al.

(10) Patent No.: US 11,068,538 B2
(45) Date of Patent: Jul. 20, 2021

(54) IN-MEMORY GRAPH ANALYTICS SYSTEM THAT ALLOWS MEMORY AND PERFORMANCE TRADE-OFF BETWEEN GRAPH MUTATION AND GRAPH TRAVERSAL

(71) Applicant: Oracle International Corporation, Redwood Shores, CA (US)

(72) Inventors: Michael Haubenschild, Erding (DE); Sungpack Hong, Palo Alto, CA (US); Hassan Chafi, San Mateo, CA (US); Korbinian Schmid, San Mateo, CA (US); Martin Sevenich, Palo Alto, CA (US); Alexander Weld, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 16/265,090

(22) Filed: Feb. 1, 2019

(65) Prior Publication Data

US 2019/0163704 A1    May 30, 2019

Related U.S. Application Data

(63) Continuation of application No. 15/443,327, filed on Feb. 27, 2017, now Pat. No. 10,235,474.

(51) Int. Cl.
*G06F 16/00* (2019.01)
*G06F 16/901* (2019.01)
*G06F 16/28* (2019.01)

(52) U.S. Cl.
CPC .......... *G06F 16/9024* (2019.01); *G06F 16/28* (2019.01)

(58) Field of Classification Search
CPC .... G06F 16/9024; G06F 16/21; G06F 16/211; G06F 16/28
See application file for complete search history.

(56) References Cited

U.S. PATENT DOCUMENTS

| | | |
|---|---|---|
| 5,822,592 A | 10/1998 | Zhu |
| 7,624,081 B2 | 11/2009 | Zhao et al. |

(Continued)

OTHER PUBLICATIONS

Merrill et al. Scalable GPU Graph Traversal, 2012, 11 pages (Year: 2012).*

(Continued)

*Primary Examiner* — Noosha Arjomandi
(74) *Attorney, Agent, or Firm* — Hickman Becker Bingham Ledesma LLP

(57) ABSTRACT

Techniques herein are for navigation data structures for graph traversal. In an embodiment, navigation data structures that a computer stores include: a source vertex array of vertices; a neighbor array of dense identifiers of target vertices terminating edges; a bidirectional map associating, for each vertex, a sparse identifier of the vertex with a dense identifier of the vertex; and a vertex array containing, when a dense identifier of a source vertex is used as an offset, a pair of offsets defining an offset range, for use with the neighbor array. The source vertex array, using the dense identifier of a particular vertex as an offset, contains an offset, into a neighbor array, of a target vertex terminating an edge originating at the particular vertex. The neighbor array contiguously stores dense identifiers of target vertices terminating edges originating from a same source vertex.

20 Claims, 12 Drawing Sheets

(56) References Cited

U.S. PATENT DOCUMENTS

| | | | |
|---|---|---|---|
| 8,996,492 | B2 | 3/2015 | Paradies et al. |
| 9,195,941 | B2 | 11/2015 | Mojsilovic et al. |
| 9,672,656 | B1* | 6/2017 | McPhail ............... G06T 15/20 |
| 10,599,656 | B1 | 3/2020 | Sharma |
| 2011/0307685 | A1 | 12/2011 | Song |
| 2012/0297145 | A1* | 11/2012 | Castillo ............... G06F 11/3466 |
| | | | 711/138 |
| 2014/0050417 | A1* | 2/2014 | Jiang ..................... G06T 5/002 |
| | | | 382/261 |
| 2014/0177008 | A1* | 6/2014 | Raymond ............ B42D 25/342 |
| | | | 358/3.28 |
| 2014/0189665 | A1* | 7/2014 | Hong ..................... G06F 8/443 |
| | | | 717/151 |
| 2014/0282384 | A1* | 9/2014 | Pamer ..................... G06F 8/437 |
| | | | 717/113 |
| 2014/0380282 | A1* | 12/2014 | Ravindranath Sivalingam .......... |
| | | | G06F 11/3644 |
| | | | 717/128 |
| 2015/0026158 | A1 | 1/2015 | Jin |
| 2015/0310644 | A1 | 10/2015 | Zhou et al. |
| 2016/0019228 | A1 | 1/2016 | Hong |
| 2016/0063132 | A1 | 3/2016 | Chen et al. |
| 2016/0071233 | A1* | 3/2016 | Macko ................. G06T 11/206 |
| | | | 345/440 |
| 2016/0078344 | A1 | 3/2016 | Agarwal et al. |
| 2016/0140152 | A1 | 5/2016 | Sevenich et al. |
| 2016/0179887 | A1 | 6/2016 | Lisonbee et al. |
| 2016/0259886 | A1* | 9/2016 | Li ......................... G16B 30/00 |
| 2016/0299991 | A1 | 10/2016 | Hong et al. |
| 2016/0306922 | A1* | 10/2016 | van Rooyen .......... G16H 50/30 |
| 2017/0169133 | A1* | 6/2017 | Kim ..................... G06F 16/2237 |
| 2017/0286122 | A1* | 10/2017 | Wu ......................... G06F 9/5027 |
| 2018/0137667 | A1* | 5/2018 | Kindelsberger .... G06F 16/9024 |
| 2018/0246986 | A1 | 8/2018 | Haubenschild |
| 2018/0357329 | A1 | 12/2018 | Meyer |
| 2019/0325075 | A1 | 10/2019 | Hilloulin |
| 2021/0132410 | A1* | 5/2021 | Bhat ..................... G02C 7/047 |

OTHER PUBLICATIONS

Haubenschild, U.S. Appl. No. 15/443,327, filed Feb. 27, 2017, Notice of Allowance dated Nov. 2, 2018.

Xirogiannopoulos et al., "Extracting and Analyzing Hidden Graphs from Relational Databases", ACM, SIGMOD dated 2017, 18 pages.

SQL Server Blog, "Graph Data Processing with SQL Server 2017 and Azure SQL Database", dated Aug. 20, 2017, 8 pages.

Oracle, "Using Property Graphs in an Oracle Database Environment", docs.oracle.com/database/122/SPGDG/using-property-graphs-oracle-database.htm#BDSPA191, Apr. 23, 2018, Apr. 23, 2018, 152 pages.

Nick Quinn, "Making sense of the graph revolution", www.JAXenter.com, dated Sep. 2013, 5 pages.

Merril et al., Scalable GPU Graph Traveral, dated 2012, 11 pages.

Merril et al., High Performance and Scalable GPU Graph Traversal, dated 2015, 30 pages.

Macko et al., "LLAMA: Efficient Graph Analytics Using Large Multiversioned Arrays." In Proceedings of the 31st IEEE International Conference on Data Engineering, dated Apr. 13-17, 2015, 13 pages.

Kaur, Sawinder, "Visualizing Class Diagram Using OrientDB NoSQL Data-Store", dated Jul. 2016, 5 pages.

Farber et al., "The SAP HANA Database-An Architecture Overview" IEEE, dated 2012, 6 pages.

Ediger et al., "STINGER: High Performance Data Structure for Streaming Graphs", IEEE, dated 2012, 5 pages.

Cruanes, U.S. Appl. No. 15/716,345, filed Sep. 26, 2017, Notice of Allowance dated Nov. 21, 2019.

Valiyev, Mahammad, "Graph Storage: How Good is CSR Really?", dated Dec. 10, 2017, 8 pages.

Kesheng Wu et al., "A Performance Comparison of Bitmap Indexes", proceedings of the 2001 ACM CIKM 10th International Conference on Information and Knowledge Management, dated Oct. 5, 2001, 2 pages.

Hilloulin, U.S. Appl. No. 15/956,115, filed Apr. 18, 2018, Office Action dated Jun. 19, 2020.

Anonymous, "Universally Unique Identifer", Wikipedia, dated Feb. 13, 2018, www.web/2018020325/https://en.wikipedia.org/wiki/Universally_unique_identifer, 10 pages.

Ahmed Elgohary et al., "Compressed Linear Algebra for Large-Scale Machine Learning", VLDB Journal, No. 27, No. 5, dated Sep. 12, 2017, pp. 719-744.

* cited by examiner

FIG. 8

COMPUTER 600

BIDIRECTIONAL MAP 840

| SPARSE ID | 49 | 3456 | 8 |
|---|---|---|---|
| DENSE ID | 0 | 1 | 2 |

VERTEX ARRAY 871

| DENSE ID | 0 | 1 | 2 |
|---|---|---|---|
| OFFSET | -0 | 0 | 1 |

COLOR ARRAY 882

| OFFSET | 0 | 1 |
|---|---|---|
| COLOR | GREEN | BLACK |

VERTEX ARRAY 870

| DENSE ID | 0 | 1 | 2 |
|---|---|---|---|
| LOWER OFFSET | -0 | 3 | -4 |
| UPPER OFFSET | -3 | 4 | 5 |

WEIGHT ARRAY 861

| OFFSET | 0 | 1 | 2 | 3 | 4 |
|---|---|---|---|---|---|
| WEIGHT | 6.7 | 8.1 | 7.1 | 8.5 | 8.9 |

MATERIALIZED ARRAY 880

| OFFSET | 0 | 1 | 2 | 3 | 4 |
|---|---|---|---|---|---|
| SPARSE ID | 3456 | 49 | 3456 | 3456 | 3456 |

FIG. 10

COMPUTER 600

VERTEX ARRAY 870

| DENSE ID | 0 | 1 | 2 |
|---|---|---|---|
| LOWER OFFSET | -0 | 3 | -3 |
| UPPER OFFSET | -3 | 3 | 4 |

INBOUND VERTEX ARRAY 1070

| DENSE ID | 0 | 1 | 2 |
|---|---|---|---|
| LOWER OFFSET | -0 | -1 | 4 |
| UPPER OFFSET | -1 | 4 | 4 |

INBOUND MATERIALIZED ARRAY 1080

| OFFSET | 0 | 1 | 2 | 3 | 4 |
|---|---|---|---|---|---|
| SPARSE ID | 49 | 49 | 49 | 8 | |

IN TO OUT MATERIALIZED MAPPING 1090

| BACKWARD OFFSET | 0 | 1 | 2 | 3 |
|---|---|---|---|---|
| FORWARD OFFSET | 1 | 0 | 2 | 3 |

WEIGHT ARRAY 881

| OFFSET | 0 | 1 | 2 | 3 | 4 |
|---|---|---|---|---|---|
| WEIGHT | 6.7 | 8.1 | 7.1 | 8.9 | |

MATERIALIZED ARRAY 880

| OFFSET | 0 | 1 | 2 | 3 | 4 |
|---|---|---|---|---|---|
| SPARSE ID | 49 | 3456 | 3456 | 3456 | |

FIG. 11

IN-MEMORY GRAPH ANALYTICS SYSTEM THAT ALLOWS MEMORY AND PERFORMANCE TRADE-OFF BETWEEN GRAPH MUTATION AND GRAPH TRAVERSAL

BENEFIT CLAIM

This application claims benefit and priority under 35 U.S.C. § 120 as a Continuation of U.S. patent application Ser. No. 15/443,327, filed Feb. 27, 2017, the entire contents of which is hereby incorporated by reference for all purposes as if fully set forth herein.

FIELD OF THE DISCLOSURE

This disclosure relates to accelerated processing of graphs. Presented herein are data structures and techniques that accelerate traversal, mutation, and versioning of a directed graph.

BACKGROUND

Graph analysis is a recently popularized methodology in data analysis that considers fine-grained relationships between data entities. Conventional graph processing systems are optimized for either transactional workload or analytic workload but not both.

An analytic workload tends to be read intensive. Whereas, transactional workload tends to be update intensive.

Updating a graph typically spends much time preparing data structures and/or consumes large amounts of memory. Furthermore, many approaches fail to handle removal of vertices or edges efficiently.

An important requirement for graph analytics is (interactive) real-time data analysis. For instance, a client may monitor rapidly emerging data (e.g. twitter stream, credit card transactions), to quickly detect critical information (e.g. fraudulent uses) in the data. Such a real-time analysis requires both fast analysis and quick update of graph data.

Fast analysis and quick updating of graph data is difficult or impossible using a disk-based graph database system which does not provide the needed level of performance for analysis. An in-memory graph analytics system may be used. However, an in-memory graph analytics system is limited by the available memory and the time needed to materialize a new graph snapshot out of an original graph and a change set.

BRIEF DESCRIPTION OF THE DRAWINGS

In the drawings:

FIG. 8 is a block diagram that depicts an example computer that creates and uses property arrays to track non-topological attributes of vertices and edges whose values change, in an embodiment;

FIG. 10 is a block diagram that depicts an example computer that has a same array of changed edge values regardless of whether navigation is forward or backward, in an embodiment;

FIG. 11 is a block diagram that depicts an example computer that assigns each edge a unique integer identifier, in an embodiment;

DETAILED DESCRIPTION

Figure 1:
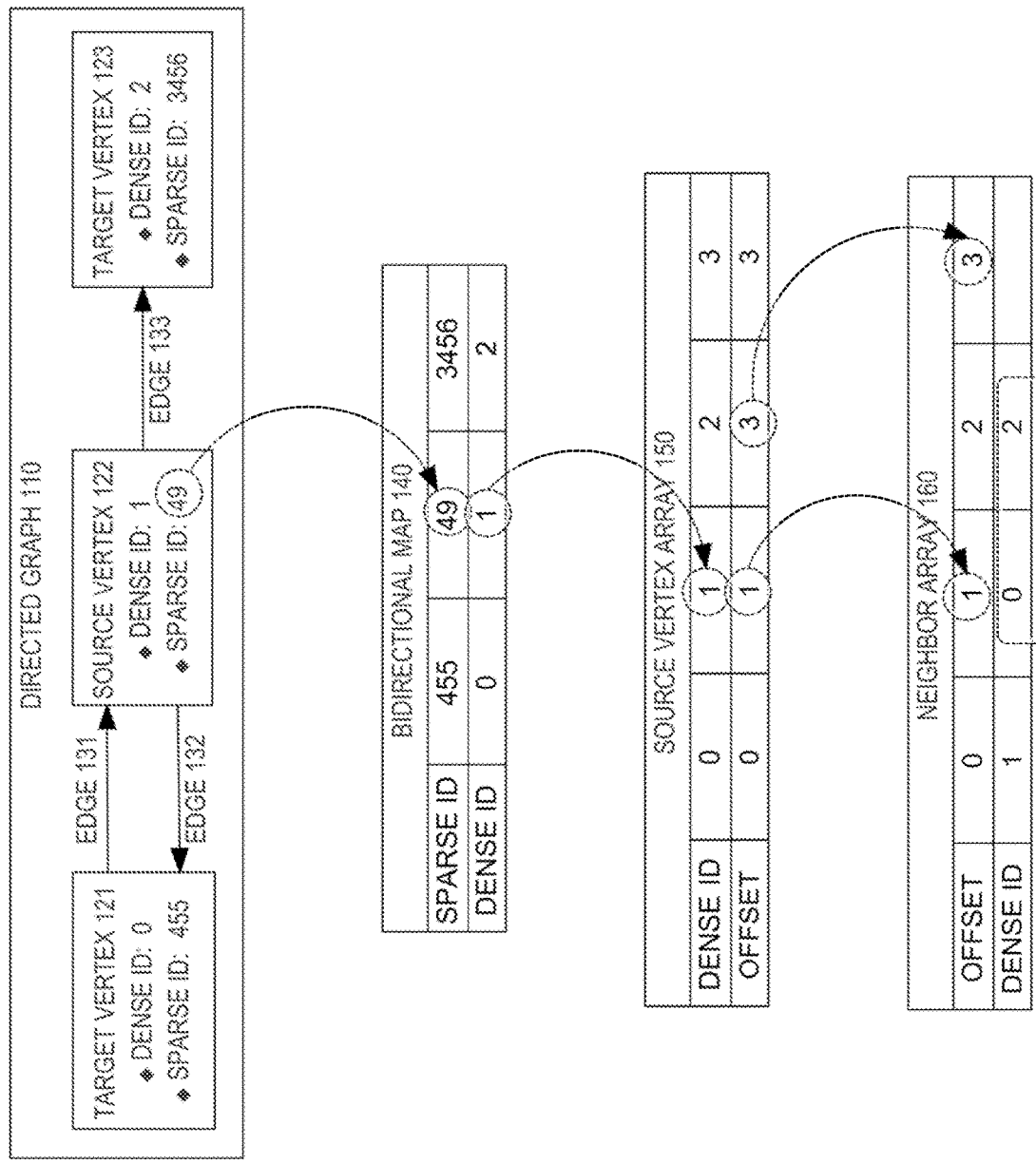
FIG. 1 is a block diagram that depicts an example computer that creates and uses navigation structures to accelerate traversal of a directed graph, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Example Computer
    2.1 Directed Graph
    2.2 Traversal
    2.3 Sparse Identifier
    2.4 Dense Identifier
    2.5 Identifier Translation
    2.6 Source Vertex Array
    2.7 Neighbor Array
    2.8 Complexity
  3.0 Mutation
    3.1 Change Buffer
  4.0 Change Execution
    4.1 Graph Versions
    4.2 Vertex Array
    4.3 Marking Bit
    4.4 Change Navigation
    4.5 Materialized Array
    4.6 Partial Materialization
    4.7 Full Materialization
    4.8 Version Lifecycle
  5.0 Change Execution Process
    5.1 Loading
    5.2 Buffering
    5.3 Applying
    5.4 Versioning 6.0 Backward Navigation
  6.1 Reverse Source Vertex Array
  6.2 Inbound Neighbor Array
  6.3 Backward Change Navigation
  6.4 Inbound Vertex Array
  6.5 Inbound Materialized Array
7.0 Example Graph Interface
8.0 Properties
  8.1 Property Array
9.0 Property Changes
  9.1 Edge Property Change
  9.2 Vertex Property Change
10.0 Bidirectional Properties
  10.1 In To Out Source Mapping
11.0 Bidirectional Property Changes
  11.1 In To Out Materialized Mapping
12.0 Edge Identifier
13.0 Hardware Overview 1.0 General Overview Techniques are provided for creating and using navigation data structures to accelerate traversal of a directed graph. The navigation data structures may accelerate traversal, mutation, and versioning of a directed graph. In an embodiment, navigation data structures that a computer stores include:
  a source vertex array of vertices of a directed graph,
  a neighbor array that contains dense identifiers of target vertices that terminate edges of the directed graph,
  a bidirectional map that, for each vertex of the directed graph, associates a sparse identifier of the vertex with a dense identifier of the vertex, and
  a vertex array that, when a dense identifier of a source vertex is used as an offset, contains a pair of offsets that define a range of offsets, for use with the neighbor array.

Each vertex of the graph is identifiable by each of: a dense identifier comprising an offset of the vertex within the source vertex array, and a sparse identifier. A particular vertex of the directed graph originates one or more edges. Each edge of the particular vertex terminates at a respective target vertex. The source vertex array, using the dense identifier of a particular vertex as an offset, contains an offset, into a neighbor array, of a target vertex that terminates an edge that originates at the particular vertex. Within the neighbor array, dense identifiers of target vertices that terminate edges that originate from a same source vertex are stored contiguously. The neighbor array is sorted by the dense identifier of the source vertex of the edge that terminates the target vertex.

Some embodiments use a change buffer to decouple change specification from change execution. Thus, pending changes may be deferred and batched to minimize the potential disruption of graph mutation. When the changes are eventually applied to the graph, additional navigation data structures may be populated to reflect the changes and without needing to disturb the previous representation of the graph. Thus, multiple versions of the graph may be maintained.

Although the edges of the graph are directed, some embodiments have additional navigation data structures for graph traversal in a direction opposite of the edges. Thus, the graph may be navigated forward or backward. For example, a graph may be traversed as if the graph were undirected.

Some embodiments have additional data structures to accelerate property access based on whether a vertex or edge is changed or unchanged and based on whether the graph is traversed forwards or backwards.

2.0 Example Computer

FIG. 1 is a block diagram that depicts an example computer 100, in an embodiment. Computer 100 creates and uses navigation structures to accelerate traversal of directed graph.

Computer 100 may be a rack server such as a blade, a personal computer, a mainframe, a network appliance, a virtual machine, a smartphone, or other computing device. In embodiments, computer 100 accesses directed graph 110 that is stored in memory, on disk, or over a network.

2.1 Directed Graph

Directed graph 110 is a logical graph composed of vertices, such as 121-123, that are interconnected by directed edges, such as 131-133. Each edge originates from a source vertex and terminates at a target vertex. For example, edge 132 originates from source vertex 122 and terminates at target vertex 121.

A vertex may serve as a source vertex for some edges and a target vertex for other edges. For example, vertex 122 is a source vertex for edge 132 and a target vertex for edge 131.

A vertex need not originate any edges or need not terminate any edges. For example, target vertex 123 does not originate any edges. Although not shown, an edge may originate from and terminate at a same vertex.

For example, directed graph 110 may be too big to store entirely within the memory of computer 100. For example, directed graph 110 may contain billions of vertices and trillions of edges. For example, directed graph 110 may encode an artificial neural network.

2.2 Traversal

During operation, computer 100 may analyze or otherwise process directed graph 110 in a way that entails traversing some or all of the vertices and edges of directed graph 110. For example, computer 100 may detect whether one vertex is reachable from another vertex of directed graph 110.

Such processing may entail repeated traversal of some vertices or edges. For example, a depth first traversal may involve backtracking over already traversed vertices and edges.

Likewise, processing may entail random access of a vertex or edge. For example, a breadth first traversal may involve incrementally expanding a search radius or horizon to include more edges and vertices of directed graph 110.

However, repeatedly accessing or scanning the same raw contents of directed graph 110 on disk may waste time and/or thrash memory. To accelerate traversal of directed graph 110, computer 100 creates, populates, and uses navigation structures, such as bidirectional map 140, source vertex array 150, and neighbor array 160.

Such populating involves computer 100 making a single pass over the raw contents of directed graph 110. As such, computer 100 visits each vertex of directed graph 110 once.

2.3 Sparse Identifier

Within the raw contents, each vertex has a sparse identifier as assigned by computer 100. The sparse identifier may be a natural number. However, sparse identifiers need not be sequential. Computer 100 need not understand the meaning of the sparse identifier.

Furthermore, a sparse identifier need not have any meaning other than serving as a unique identifier. An external client may be exposed to sparse identifiers of vertices. For example, vertices 121-123 have respective sparse identifier values of 455, 49, and 3456.

2.4 Dense Identifier

Computer 100 assigns each vertex of directed graph 110 a dense identifier for internal use by computer 100. Dense identifiers are assigned from a zero-based sequence of natural numbers. For example, vertices 121-123 have respective dense identifier values of 0, 1, and 2.

Thus, each of vertices 121-123 is redundantly identified by a dense identifier and by a sparse identifier. Each dense identifier and each sparse identifier within directed graph 110 is unique.

In embodiments, assignment of sparse identifiers to vertices does not change. Whereas if a vertex is removed from directed graph 110, then computer 100 may reuse the dense identifier of the removed vertex by reassigning the dense identifier to a vertex that is later added to directed graph 110.

2.5 Identifier Translation

Bidirectional map 140 maintains a bijective association between the sparse identifier and the dense identifier of each vertex of directed graph 110. For example, computer 100 may use bidirectional map 140 to translate a sparse identifier into a dense identifier or vice versa.

In embodiments, bidirectional map 140 comprises a bidirectional hash map. In embodiments, bidirectional map 140 comprises an array of sparse identifiers that is sorted by dense identifiers.

In such an array embodiment, the shown row of dense identifiers may be implied (not actually stored). For example, computer 100 may use a dense identifier as an offset into the array of sparse identifiers to look up a sparse identifier of a particular vertex. In embodiments, sparse and dense identifiers are 64-bit signed or unsigned integers.

For example, an external client may request access to source vertex 122 by specifying sparse identifier 49. Computer 100 may use 49 as a lookup key into bidirectional map 140 to detect that source vertex 122 has dense identifier 1.

2.6 Source Vertex Array

As explained above, computer 100 makes a single pass over the raw contents of directed graph 110. As such, computer 100 detects which edges interconnect which vertices and in which direction.

Source vertex array 150 maintains a monotonically increasing sequence of offsets that provide information about how many outbound edges originate from each vertex of directed graph 110. The arithmetic difference between two adjacent offset values within source vertex array 150 provides a count of how many outbound edges a particular source vertex has.

The offset values are sorted by dense identifier of the source vertices. For example, the dense identifier row of source vertex array 150 has 1 as the value for source vertex 122.

In the offset row of source vertex array 150 and in the same column as dense identifier 1 is offset 1. To the right of offset 1 is offset 3, having an arithmetic difference of 3−1=two. That means source vertex 122 originates two edges, which are 132-133.

2.7 Neighbor Array

Furthermore, offsets 1 and 3 may be used as offsets for random access into neighbor array 160. Neighbors are target vertices that terminate edges that originate from a vertex. For example, target vertices 121 and 123 are neighbors of source vertex 122 by edges 132-133.

The neighbors of source vertex 122 are contiguously listed with dense identifiers 0 and 2 in neighbor array 160. The neighbors of source vertex 122 occur within neighbor array 160 at offsets ranging from 1 inclusive to 3 exclusive, which are the offsets taken from source vertex array 150 as explained above. Thus, 0 occurs at offset 1, and 2 occurs at offset 2.

Whereas, vertex 123 originates no edges, and so has no outbound/downstream neighbors. With dense identifier 2 of vertex 123 as a random access offset into source vertex array 150, offset 3 appears twice in the offset row of source vertex array 150.

Thus, 3−3=zero means that vertex 123 originates no edges and so has no neighbors. Thus, an offset range from 3 inclusive to 3 exclusive is empty. Thus, neighbor array 160 has no neighbor data for vertex 123.

2.8 Complexity

In embodiments, loading of directed graph 110 essentially consists of populating data structures 140, 150, and 160. For example after loading, computer 100 may execute graph queries, such as a Green-Marl query, such as for the shortest directed path between two given vertices.

In embodiments after loading, data structures 140, 150, and 160 are immutable. For example, concurrent readers (e.g. queries) are thread safe.

Source vertex array 150 provides random access in constant time, which is optimal. Neighbor array 160 can identify all neighbors of a source vertex in linear time, which is also optimal. Bidirectional map 140 may have various implementations such as with hashing, bucket lists, and/or dual arrays.

The computational complexity of those various implementations may or may not depend on the lookup direction during use. In any case, the computational complexity of bidirectional map 140 is expected to be constant at best and logarithmic or linear at worst.

3.0 Mutation

Figure 2:
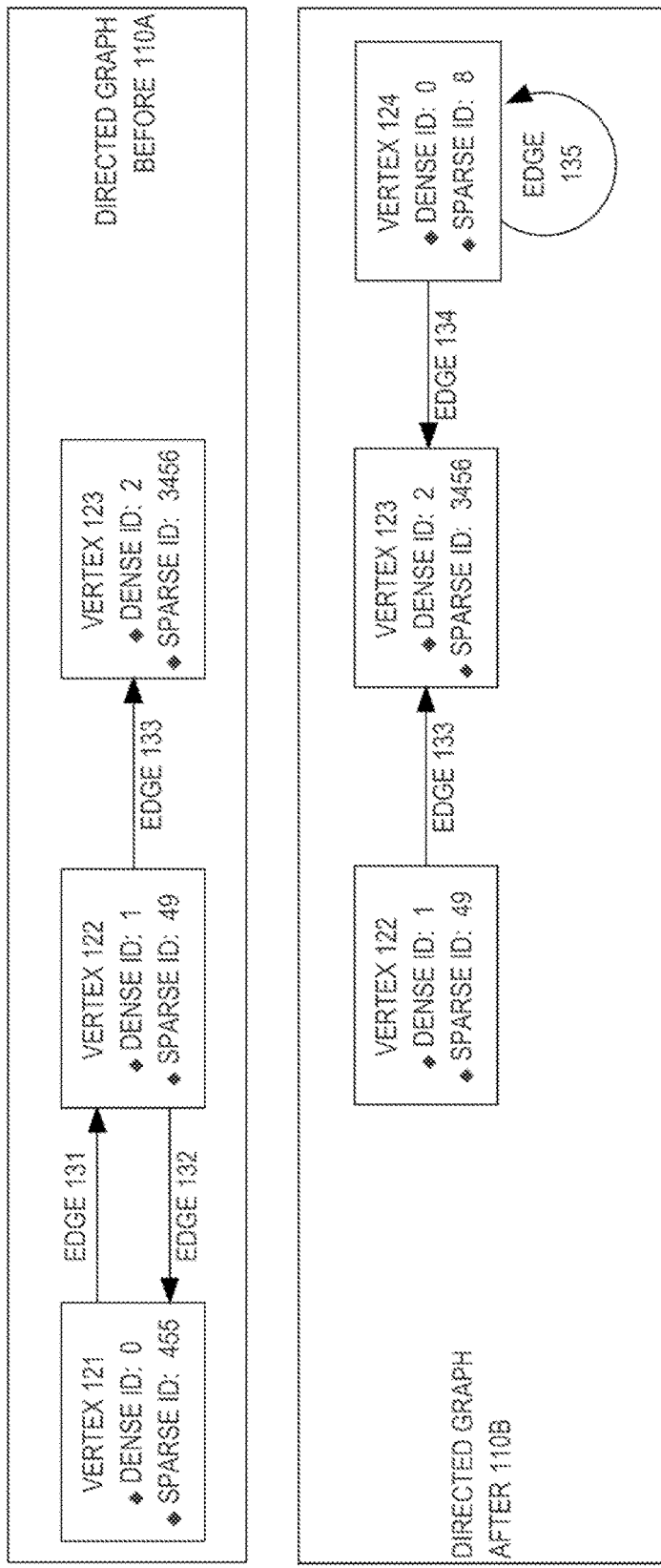
FIG. 2 is a block diagram that depicts an example computer that uses a change buffer to decouple change specification from change execution, in an embodiment.

FIG. 2 is a block diagram that depicts computer 100 again. Computer 100 uses a change buffer to decouple change specification from change execution.

Computer 100 still contains directed graph 110. Because directed graph 110 is mutated by computer 100, directed graph 110 is shown as before 110A and after 110B to illustrate the mutation.

3.1 Change Buffer

Compute 100 contains change buffer 201 that stores pending changes that will be applied to before 110A. Each row of change buffer 201 stores one requested change.

In embodiments, all of the changes shown in change buffer 201 may be for a single transaction. In embodiments, computer 100 has a separate change buffer for each pending transaction for directed graph 110, such as from different clients or different threads of a same client.

In embodiments, change buffer 201 is ordered (sorted by time as shown). In embodiments, change buffer 201 is unordered.

Depending on embodiments, change buffer 201 may be bounded or unbounded. As shown, the first (top row) change specifies removal of edge 131 that originates from vertex 121 (sparse identifier 455) and terminates at vertex 122 (sparse identifier 49).

Thus, the first change respectively lists 455 and 49 as the source vertex and target vertex. The next (second row) change lists the same sparse identifiers, but in the opposite order, which specifies removal of edge 132 that is directed in opposition to edge 131.

The third change specifies removal of vertex 121. In embodiments, the first and second changes are optional as implied by the third change. Thus, vertex removal may implicitly include removal of all edges connected to that vertex.

Computer 100 may append requested changes to change buffer 201 as they arrive. Eventually, computer 100 decides to execute the changes in the order that they appear in change buffer 201.

In embodiments, computer 100 may receive a transaction demarcation or other indication from a client, a timer, or a buffer overflow, which causes computer 100 to execute the changes specified in change buffer 201. For example, computer 100 may execute change buffer 201 when change buffer 201 contains enough changes to exceed a threshold. For another example, a client may indicate that analysis of directed graph 110 is imminent and so change buffer 201 should execute immediately, even though no buffer threshold is exceeded.

As shown, change buffer 201 has other changes, including addition of vertex 124, which may be implied by addition of edge 134. Because vertex 121 is removed and vertex 124 is added, dense identifier 0 is reassigned from vertex 121 to vertex 124. However, vertices 121 and 124 do not share a sparse identifier.

Added edge 135 shows that an edge may be self directed. Execution of all of the changes specified in change buffer 201 causes computer 100 to mutate directed graph 110 from before 110A to after 110B.

4.0 Change Execution

Figure 3:
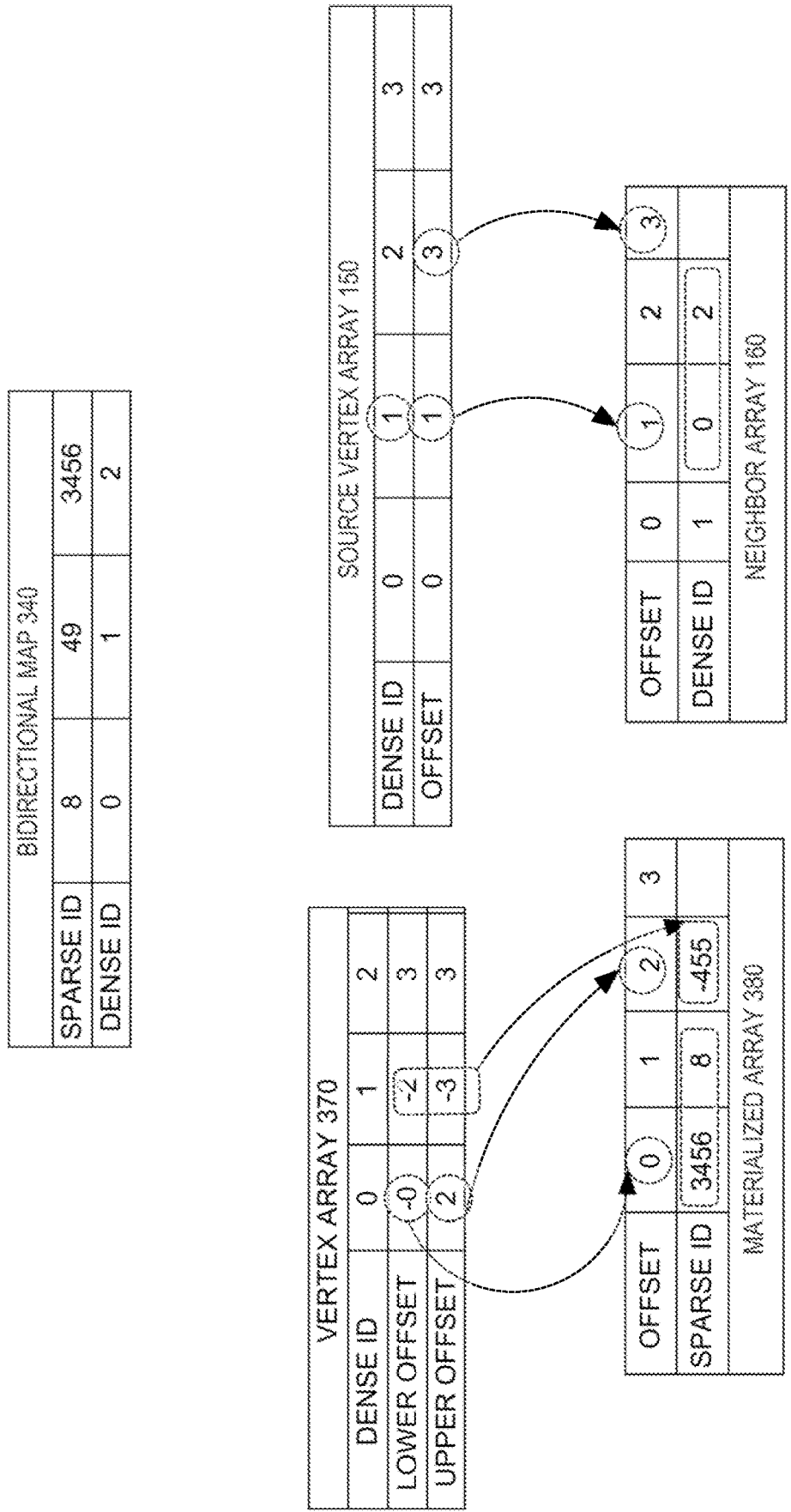
FIG. 3 is a block diagram that depicts an example computer that executes changes to a graph by populating additional navigation data structures for the graph, in an embodiment.

FIG. 3 is a block diagram that depicts computer 100 again. Computer 100 executes changes to a graph by populating additional navigation data structures for the graph.

As explained above, change buffer 201 tracks changes before they are executed. To track changes after they are executed, computer 100 creates and populates bidirectional map 340, vertex array 370, and materialized array 380.

Thus, data structures 140, 150, and 160 are populated during graph loading. Likewise, data structure 200 is populated before change execution. Likewise, data structures 340, 370, and 380 are populated during change execution.

Data structures 340, 370, and 380 selectively override information stored in data structures 140, 150, and 160. Thus, computer 100 may use data structures 340, 370, and 380 in conjunction with data structures 140, 150, and 160 to navigate directed graph 110 after graph mutation.

To start change execution, embodiments of computer 100 clone bidirectional map 140 to create bidirectional map 340. When a change removes a vertex from directed graph 110, computer 100 removes the vertex's sparse identifier and dense identifier from bidirectional map 340.

When a new vertex is added to directed graph 110, computer 100 assigns the new vertex a (possibly reused) dense identifier. Computer adds the dense and sparse identifiers of the new vertex to bidirectional map 340.

4.1 Graph Versions

Thus, bidirectional maps 140 and 340 become different, even though they once were identical. Such dual bidirectional maps facilitate simultaneous availability of two versions of directed graph 110, which are before 110A and after 110B (FIG. 2).

Embodiments that do not need to retain before 110A need not create bidirectional map 340. Such an embodiment may instead use bidirectional map 140 as if 140 were 340. Thus in embodiments, bidirectional maps 140 and 340 are one same map.

4.2 Vertex Array

Likewise, vertex array 370 reflects changes made in after 110B. Whereas, source vertex array 150 reflects before 110A.

As explained elsewhere above, source vertex array 150 has upper and lower bounds for a range of offsets within neighbor array 160. Whereas, vertex array 370 has upper and lower bounds for a range of offsets within materialized array 380.

However, the structure of vertex array 370 is somewhat different from source vertex array 150. For each dense identifier that is shown in source vertex array 150, such as the shown circled 1, source vertex array 150 has two offset values, such as the circled 1 and 3.

Thus, source vertex array 150 stores both bounds of a range in adjacent columns. Whereas, vertex array 370 stores both bounds of a range in a same column. Thus, vertex array 370 has a lower offset row and an upper offset row as shown.

4.3 Marking Bit

Furthermore, some of the offset values within vertex array 370 may be marked. Such a value may be marked by setting a sign bit or high order bit.

Values that are marked are shown with a negative sign, which may or may not be implemented with a sign bit. For example, value 0 may be marked and shown as −0, regardless of whether or not computer 100 can actually store a −0 value. For example if computer 100 uses two's complement for a 3-bit signed integer as a dense identifier, then setting the high order bit for value 0 results with value −4 instead of −0.

4.4 Change Navigation

As shown in the right column of vertex array 370, both lower and upper offsets may be unmarked (shown without negative sign). That indicates that: a) the outbound edge(s) of vertex 123 are unchanged; and b) computer 100 should use data structures 150 and 160 (but not 370 and 380) for vertex 123 when navigating both before 110A and after 110B.

As shown in the middle column of vertex array 370, both lower and upper offsets are marked with a negative sign. That indicates that: a) at least one outbound edge of vertex 122 changed; and b) computer 100 should use all of use data structures 150, 160, 370, and 380 for vertex 122 when navigating after 110B.

4.5 Materialized Array

Thus for vertex 122, data structures 150 and 160 contain original data. Whereas, data structures 370 and 380 contain changes that selectively override the original data. Thus, vertex 122 is only partially materialized, because only some of the data of vertex 122 resides in materialized array 380.

Materialized array 380 lists neighbors of source vertices. In the case of a partially materialized vertex, such as 122, only some neighbors (due to added or removed edges) are tracked in materialized array 380. Whereas, other neighbors (due to unchanged edges) are still tracked in neighbor array 160.

For example in before 110A, vertex 122 originated edges 132-133 that terminated at neighbors 121 and 123, which are shown as dense identifiers 0 and 2 in neighbor array 160. However, edge 132 is removed in after 110B.

Removal of edge 132 is shown in data structures 370 and 380 as follows. The marked −2 and −3 of vertex array 370 are used as if unmarked (2 and 3) as offsets into materialized array 380.

The range of offsets to use in materialized array 380 is defined by the lower offset 2 (without sign) inclusive and upper offset 3 (without sign) exclusive. Thus, 3−2=one indicates that materialized array 380 overrides only one neighbor of the neighbors listed in neighbor array 160 for vertex 122.

Thus for vertex 122, only edge 132 is overridden by materialized array 380, shown as −455. The negative sign need not literally be a sign bit, but may instead be any marking, such as a bit in a separate bit mask. Thus, −455 means that 455 is marked.

That mark indicates edge removal. Thus, edge 132 is indicated as removed.

4.6 Partial Materialization

However, 455 is the only edge for vertex 122 that is changed. Edge 133 remains unchanged for vertex 122.

As explained elsewhere above, for source vertex 122, edge 133 appears in neighbor array 160 as dense identifier 2. Thus, computer 100 uses data structures 140, 150, 160, 340, 370, and 380 to detect that vertex 122 originates only edge 133 (but not 132) in after 110B.

4.7 Full Materialization

As explained above, vertex 122 is only partially materialized. Whereas, some vertices may qualify for full materialization to list all of its neighbors in materialized array 380.

In embodiments, a vertex qualifies for full materialization after buffering or executing a threshold amount of changes. Criteria to qualify for full materialization depend on embodiments.

In embodiments, a vertex qualifies for full materialization if the vertex is newly added, such as vertex 124. For example as shown in the left column of vertex array 370, only the lower offset is marked with a negative sign. That indicates that: a) vertex 124 is fully materialized; b) all of the neighbors of vertex 124 are listed in materialized array 380; and c) computer 100 should use data structures 370 and 380 (but not 150 and 160) for vertex 124 when navigating after 110B.

The 2 and marked −0 for vertex 124 in vertex array 370 are used as if unmarked (0 and 2) as offsets into materialized array 380.

The range of offsets to use in materialized array 380 is defined by the lower offset 0 (without sign) inclusive and upper offset 2 exclusive. Thus, 2-0=two indicates that fully materialized vertex 124 has two neighbors, shown as sparse identifiers 3456 and 8 in materialized array 380.

4.8 Version Lifecycle

As explained elsewhere above, data structures 140, 150, and 160 are used to navigate before 110A. Those data structures along with data structures 340, 370, and 380 are used to navigate after 110B.

Thus, computer 100 may simultaneously provide before 110A to some clients and after 110B to other clients. In embodiments, a client specifies which version (110A or 110B) of directed graph 110 to use for that client.

Versions 110A and 110B need not be the only versions of directed graph 110. Computer 100 may eventually regenerate data structures 140, 150, and 160 using information from data structures 340, 370, and 380, so that data structures 140, 150, and 160 may represent version 110B.

Likewise, change buffer 201 may refill with new changes to be applied to version 110B to create version 110C (not shown). Computer 100 may execute refilled buffer 201 (or a different change buffer) to regenerate data structures 340, 370, and 380 to create version 110C.

Embodiments may create a long sequence of versions of directed graph 110. Any version may be persisted or otherwise exported in an interchange format or other external format, such as resource description framework (RDF) or data manipulation language (DML) for structured query language (SQL).

Embodiments may export directed graph 110 from data structures 140, 150, and 160 or from those data structures along with 340, 370, and 380. Embodiments may import (load graph data and populate the navigation data structures) directed graph 110 from a persistence format or other external format. In embodiments, a client may request a version to load or save.

5.0 Change Execution Process

Figure 4:
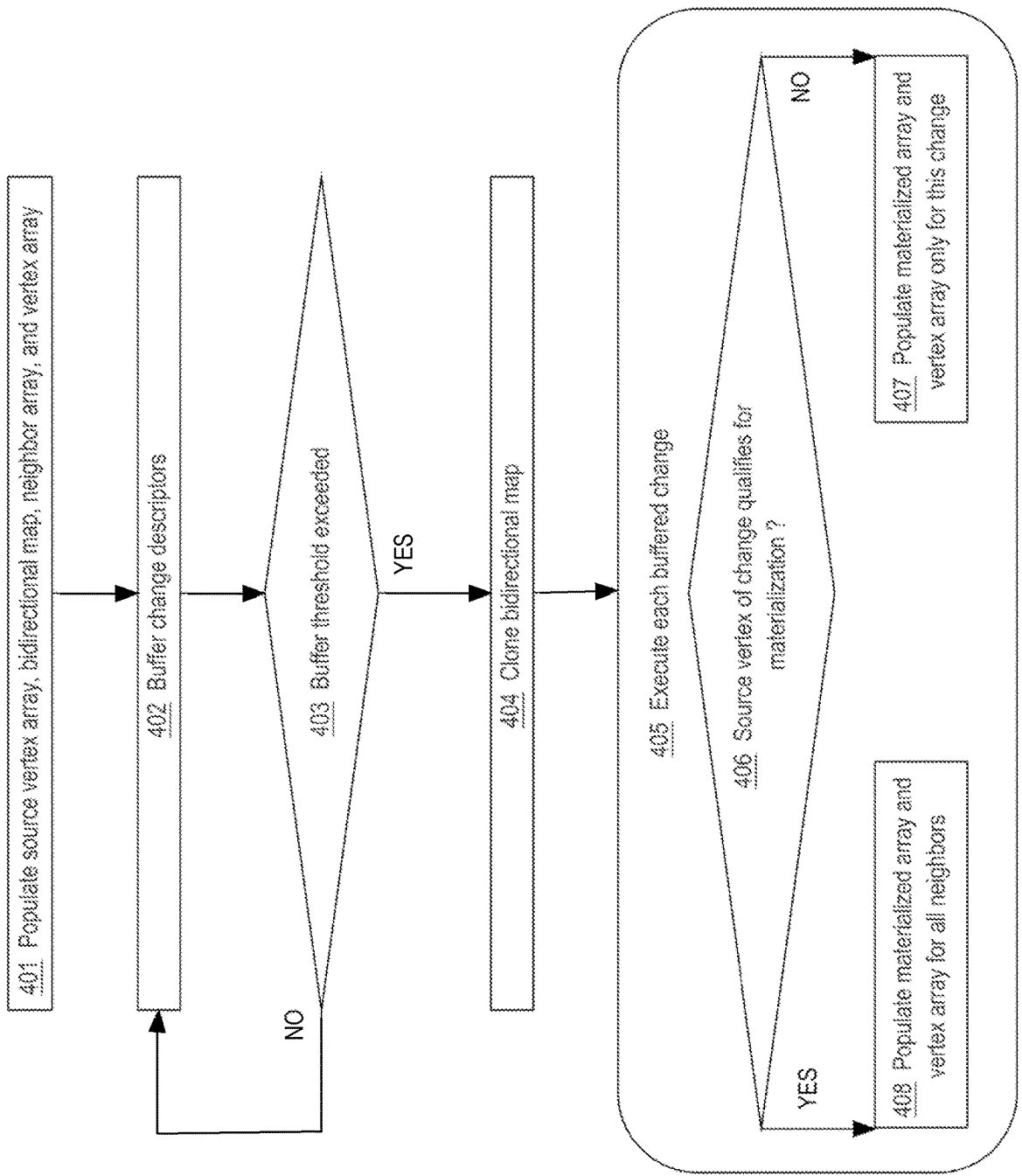
FIG. 4 is a flow diagram that depicts an example process that executes changes to a graph by populating additional navigation data structures for the graph, in an embodiment.

FIG. 4 is a flow diagram that depicts an example process that executes changes to a graph by populating additional navigation data structures for the graph. FIG. 4 is discussed with reference to FIGS. 1-3.

5.1 Loading

Step 401 populates graph navigation structures that include a source vertex array, a bidirectional map, a neighbor array, and a vertex array. For example, computer 100 loads the topology of directed graph 110 from a file(s), which includes populating data structures 140, 150, and 160.

Some embodiments eagerly load some non-topological properties of edges and vertices, such as color and weight. Some embodiments lazily load such properties when accessed. Properties are discussed elsewhere below herein.

Heap based data structures such as trees, vectors, and hash tables may be balanced or trimmed immediately after being populated. When step 401 finishes, computer 100 may provide read and write access to version 110A.

5.2 Buffering

Step 402 buffers change descriptors. For example, a client submits a transaction to make multiple changes to version 110A.

Each change in the transaction is specified in a change descriptor. Thus, the client may fill change buffer 201 with those change descriptors.

Step 402 does not disturb data structures 140, 150, and 160, which may be immutable. Thus, version 110A may simultaneously sustain multiple writers and multiple readers.

A large transaction may have more changes than can fit within change buffer 201. The client(s) may submit changes individually or in small batches.

After each small submission, step 403 may detect whether or not to begin executing buffered changes. For example, a threshold such as a buffer overflow or a transaction boundary may or may not occur.

5.3 Applying

If the threshold is not crossed, then computer 100 repeats steps 402-403 until the threshold is crossed. When the threshold is crossed, then steps 404-408 execute (apply) the buffered changes to create version 110B.

Even while changes are being executed, version 110A may simultaneously sustain multiple readers. Embodiments may forbid clients to write version 110A after step 404 begins.

Embodiments may refuse to buffer further changes until steps 404-408 finish (executing already buffered changes) and version 110B is ready.

Step 404 is preparatory. In step 404, computer 100 may clone bidirectional map 340 from bidirectional map 140.

Embodiments may instead update and reuse bidirectional map 140. However, such reuse may cease the availability of version 110A.

Also during step 404, computer 100 analyzes change buffer 201 to detect which source vertices of buffered changes qualify for materialization. Thus according to the buffered changes, step 404 selects a subset of source vertices to materialize.

Step 405 is repeated for each pending change in change buffer 201. Compound step 405 contains sub-steps 406-408.

Step 406 detects whether the source vertex of a pending change currently being executed is among the subset of source vertices that were selected in step 404 for full materialization. Qualification criteria are discussed elsewhere above herein.

For example, full materialization may occur if a source vertex originates at least five changed (added or removed) edges or if the source vertex is itself new. For example, change buffer 201 contains only deletes one edge that originates from vertex 122.

That is not enough changes to trigger full materialization. Thus for vertex 122, step 407 occurs instead of step 408.

Step 407 populates data structures 370 and 380 with the current edge change, but not other edges of the current vertex. For example, computer 100 updates data structures 370 and 380 to reflect that edge 132 is removed, as explained elsewhere above.

Whereas, vertex 124 is new and qualifies for full materialization in step 406. Thus, step 408 occurs for vertex 124.

Step 408 populates data structures 370 and 380 with all edges that originate at the current vertex. For example, computer 100 updates data structures 370 and 380 to reflect that edges 134-135 are added, as explained elsewhere above.

Computer 100 repeats compound step 405 until all pending changes in change buffer 201 are executed. When step 405 is finished for all pending changes, then version 110B is available to clients.

5.4 Versioning

After creating version 110B, computer 100 may administer directed graph 110 as follows. Computer 100 may use information from data structures 150, 160, 340, 370, and 380 to create and populate new instances of data structures 140, 150, and 160 for version 110B.

In that way, computer 100 may replace version 110A with version 110B as a new baseline. Computer 100 may abandon or retain data structures 140, 150, and 160 of version 110A.

Computer 100 may create additional versions such as 110C (not shown) in the same way. Computer 100 may use data structures 150, 160, 340, 370, and 380 to create and populate new instances of data structures 140, 150, and 160 for version 110C.

6.0 Backward Navigation

Figure 5:
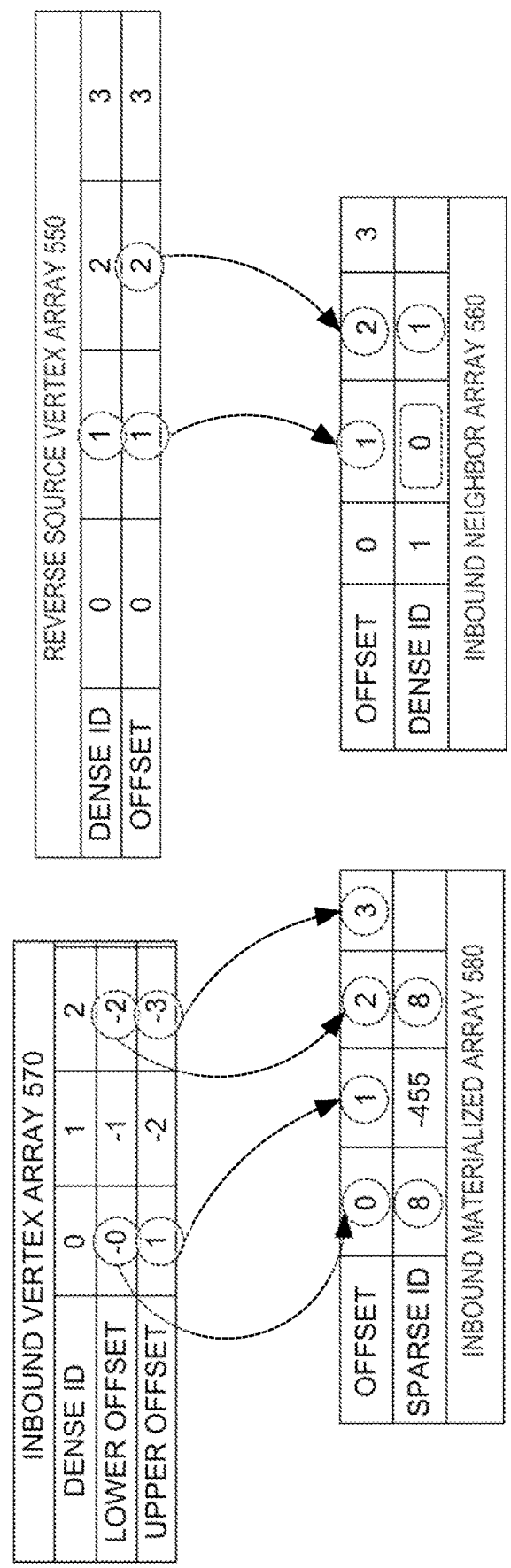
FIG. 5 is a block diagram that depicts an example computer that creates and uses navigation structures to accelerate backwards traversal of a directed graph, in an embodiment.

FIG. 5 is a block diagram that depicts computer 100 again. Computer 100 creates and uses navigation structures to accelerate backwards traversal of a directed graph.

FIGS. 1-4 show how to populate and use navigation data structures to traverse directed graph 110 in the same direction as edges specify. For example, a source vertex originates a directed edge that is traversed from the source vertex to a target vertex that terminates the edge.

Whereas, some graph analysis may need to traverse edges backwards from target vertex to source vertex. Likewise, some graph analysis may need to treat directed graph 110 as if it were undirected, such that edge direction is sometimes or always ignored.

6.1 Reverse Source Vertex Array

To support backwards traversal, computer 100 has additional data structures that correspond to data structures discussed elsewhere above. For example, reverse source vertex array 550 encodes vertices that terminate edges in a way that is similar to how source vertex array 150 encodes vertices that originate edges.

6.2 Inbound Neighbor Array

Likewise, inbound neighbor array 560 encodes edges that terminate at vertices in a way that is similar to how neighbor array 160 encodes edges that originate at vertices.

For example in the offset row of reverse source vertex array 550 and in the same column as dense identifier 1 is offset 1. To the right of offset 1 is offset 2, having an arithmetic difference of 2−1=one.

That means source vertex 122 terminates one edge, which is 131. Furthermore, offsets 1 and 2 may be used as offsets for random access into inbound neighbor array 560.

The backwards neighbor of source vertex 122 is listed with dense identifier 0 in inbound neighbor array 560. Data structures 550 and 560 may be populated when data structures 150 and 160 are populated.

Furthermore, bidirectional map 140 may be shared for both forward navigation and backward navigation. Thus, backward navigation of version 110A may use data structures 140, 550, and 560.

6.3 Backward Change Navigation

As explained elsewhere above, data structures 340, 370, and 380 supplement data structures 140, 150, and 160 to provide forward navigation for version 110B. Data structures 570 and 580 are added to provide backward navigation for version 110B.

Data structures 570 and 580 may be populated when data structures 370 and 380 are populated. Bidirectional map 340 may be shared for both forward navigation and backward navigation of version 110B.

Thus, backward navigation of version 110B may use data structures 340, 570, and 580. Data structures 570 and 580 respectively correspond to data structures 370 and 380, but for backward neighbors instead of forward neighbors.

6.4 Inbound Vertex Array

As shown in the right column of inbound vertex array 570, both lower and upper offsets are marked with a negative sign. That indicates that: a) at least one inbound edge of vertex 123 changed; and b) computer 100 should use all of use data structures 550, 560, 570, and 580 for vertex 123 when navigating version 110B.

6.5 Inbound Materialized Array

Thus for vertex 123, data structures 550 and 560 contain original data. Whereas, data structures 570 and 580 contain changes that selectively override the original data. Thus, vertex 123 is only partially materialized, because only some of the data of vertex 123 resides in inbound materialized array 580.

Inbound materialized array 580 lists backward neighbors of target vertices. In the case of a partially materialized vertex, such as 123, only some neighbors (due to added or removed edges) are tracked in inbound materialized array 580. Whereas, other neighbors (due to unchanged edges) are still tracked in inbound neighbor array 560.

For example in version 110A, vertex 123 terminated edge 133 that originated at neighbor 122, which is shown as dense identifier 1 in inbound neighbor array 560. However, vertex 123 also terminates edge 134 that is added in version 110B.

Addition of edge 134 is shown in data structures 570 and 580 as follows. The marked −2 and −3 of inbound vertex array 570 are used as if unmarked (2 and 3) as offsets into inbound materialized array 580.

The range of offsets to use in inbound materialized array 580 is defined by the lower offset 2 (without sign) inclusive and upper offset 3 (without sign) exclusive. Thus, 3−2=one indicates that inbound materialized array 580 overrides only one neighbor of the neighbors listed in inbound neighbor array 560 for vertex 123.

Thus for vertex 123, only edge 134 is overridden by inbound materialized array 580, shown as 8. The 8 is not marked as negative. Thus, edge 134 is indicated as added instead of removed.

Thus, vertex 123 is only partially materialized. Whereas, some vertices may qualify for full materialization to list all of its backwards neighbors in inbound materialized array 580.

Full or partial materialization of a vertex in the forward direction may be independent of materialization of the vertex in the backward direction. For example, vertex 123 is unchanged (not materialized) in materialized array 380 in the forward direction. Whereas, vertex 123 is partially materialized in inbound materialized array 580 in the backward direction.

7.0 Example Graph Interface

The following is an example Java interface that may encapsulate navigation data structures 140, 150, 160, 340, 370, 380, 550, 560, 570, and 580 for traversing a directed graph.

```
1  GraphInterface {
2      int numVertices( )
3      long numEdges( )
4      long numNeighbors(int id)
5      long numNeighborsRev(int id)
6      void iterateNeighbors(int id, (nbr,idx) -> { })
7      void iterateNeighborsRev(int id, (nbr,idx) -> { })
8      void iterateCommonNeighbors(int id1, int id2,
9             (commonNeighbor,idx1,idx2) -> { }
10     )
11 }
```

The methods numVertices and numEdges respectively return a count of vertices or edges of a graph. The method numNeighbors returns a count of outbound (forward) neighbors for a given vertex.

The GraphInterface expects dense identifiers as arguments. Method numNeighborsRev does the same for inbound (backward) neighbors.

Methods numVertices, numEdges, numNeighbors, and numNeighborsRev have O(1) complexity. Whereas, iterateNeighbors is the most complex method.

Method iterateNeighbors takes a dense identifier and a callback/lambda, which is called for every neighbor of the given vertex. The callback receives an index that uniquely identifies the corresponding edge from v to n.

For example, redundant edges (not shown) that connect a same two vertices in a same direction causes two invocations of the callback. Each invocation bears the index of one redundant edge. The method iterateCommonNeighbors is explained elsewhere below herein.

8.0 Properties

Figure 6:
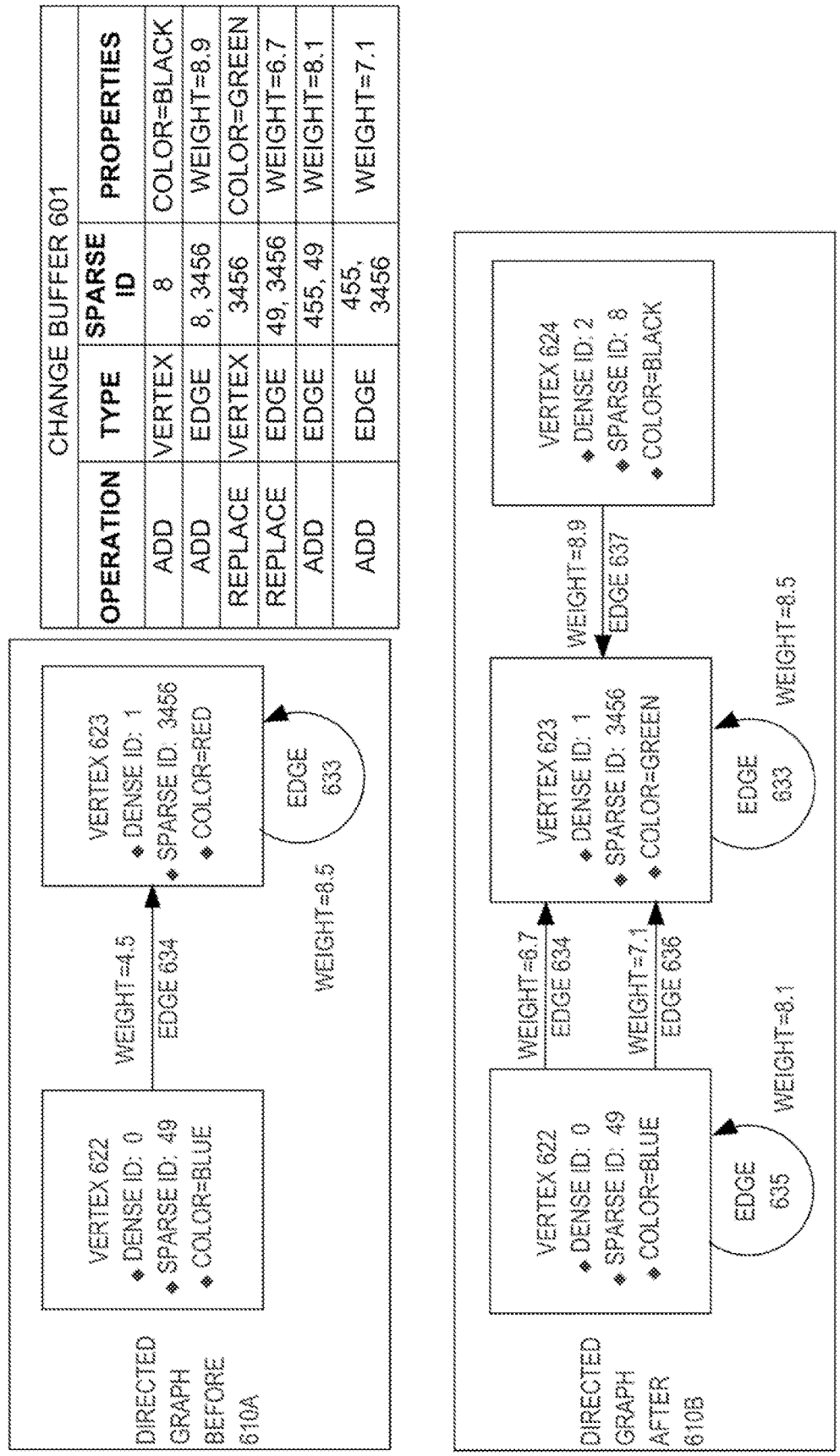
FIGS. 6-7 are block diagrams that depict an example computer that creates and uses property arrays to track non-topological attributes of vertices and edges, in an embodiment.
Figure 7:
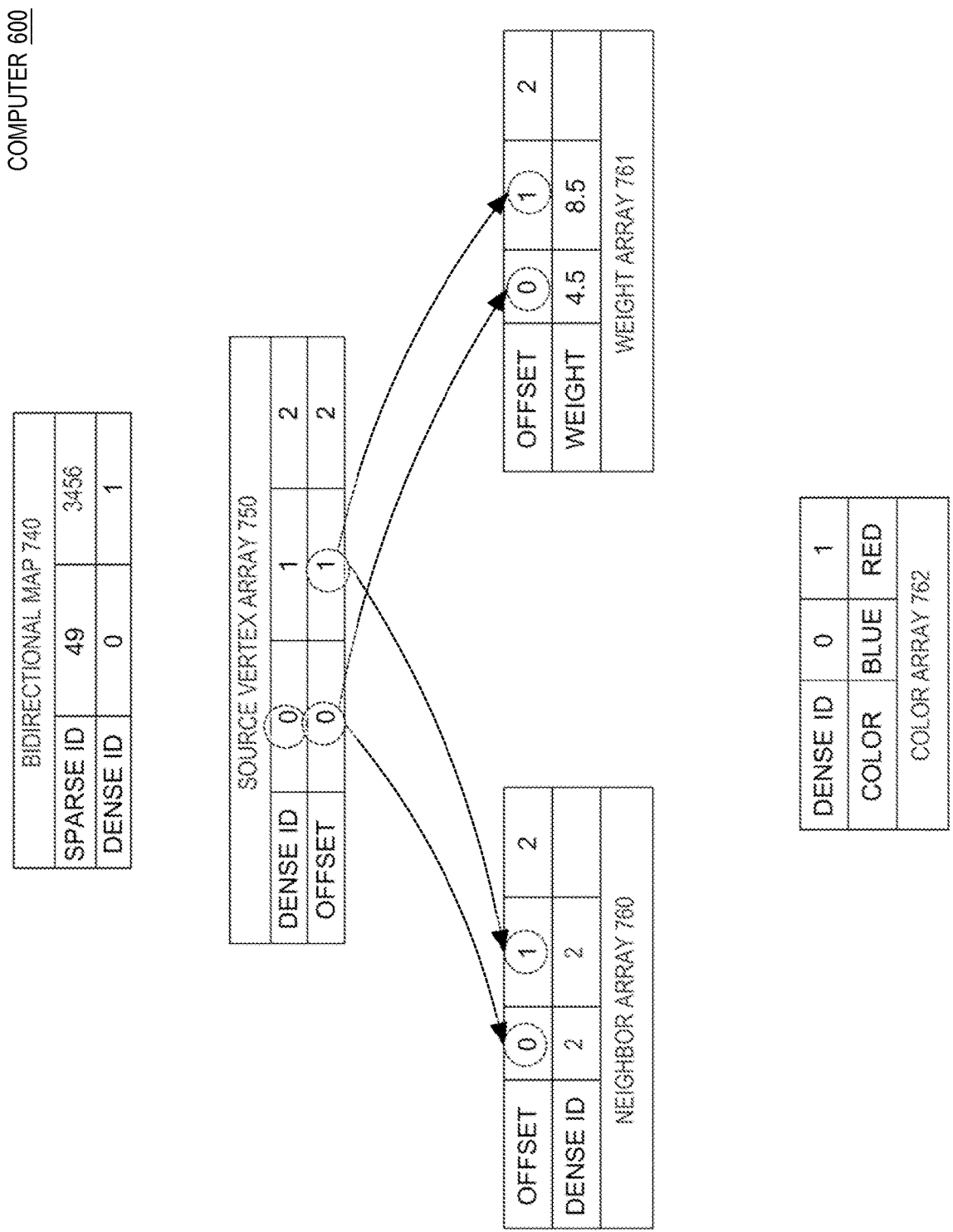

FIGS. 6-7 are block diagrams that depict example computer 600 in an embodiment. Computer 600 creates and uses property arrays to track non-topological attributes of vertices and edges. Computer 600 may be an implementation of computer 100.

Computer 600 may load before 610A as a version of a directed graph. Loading includes populating navigation data structures 740, 750, and 760, which are respectively similar to data structures 140, 150, and 160.

8.1 Property Array

Computer 600 also contains property arrays that contain property values for vertices or edges. The format of a property array depends on whether the array stores values of a vertex property or an edge property.

In this example, each vertex has a color property. Color values are stored in color array 762. If vertices have other properties, such as age (not shown), then computer 600 would have other property arrays (not shown).

Each vertex property array is logically parallel to source vertex array 750. That is, data structures 750 and 762 have an entry for each vertex of the graph and use a dense identifier as a lookup key. For example, the color of vertex 622 is blue.

In this example, each edge has a weight property. Weight values are stored in weight array 761. If edges have other properties, such as date (not shown), then computer 600 would have other property arrays (not shown).

Each edge property array is logically parallel to neighbor array 760. That is, data structures 760 and 761 have an entry for each edge of the graph and use a range (pair) of offsets as a lookup key to identify a list of edges that originate at a same source vertex. For example, the weight of edge 634 is 4.5 in version 610A.

9.0 Property Changes

FIG. 8 is a block diagram that depicts computer 600 again. Computer 600 creates and uses property arrays to track non-topological attributes of vertices and edges whose values change.

Change buffer 601 (FIG. 6) stores pending changes whose application to version 610A creates version after 610B. For example, the color of vertex 623 changes from red to green.

Each change may add, remove, or adjust a vertex or edge. For example, a change may replace one value of a property with another value.

In embodiments, a change may adjust multiple properties of a same vertex or edge. In other embodiments, multiple changes are needed to adjust multiple properties of a same edge or vertex.

In embodiments, the replace operation is implemented more or less as if the vertex or edge were removed and then re-added with a new property value. Some such embodiments may require the remove and re-add to appear in change buffer 601 as separate changes.

Computer 600 executes the changes in change buffer 601 to create version 610B. This includes populating navigation data structures 840, 870, and 880 that are respectively similar to navigation data structures 340, 370, and 380. Data structures 870 and 880 track topological changes.

9.1 Edge Property Change

New values of edge weights are stored in weight array 881 to selectively override the values of weight array 761. If edges have other properties, such as date (not shown), then computer 600 would have other property arrays (not shown).

Each array of edge property values is logically parallel to materialized array 880. That is, data structures 880-881 each have an entry for each changed edge of the graph and use a range (pair) of offsets as a lookup key to identify a list of changed edges that originate at a same source vertex.

For example, the weight of edge 634 is changed to 6.7 in version 610B. In this embodiment and because a property of edge 634 changed, edge 634 appears as a first 3456 in materialized array 880, even though edge 634 is not new.

That is, materialized array 880 may also have an entry for an edge (target vertex) that is neither added nor removed but has a changed property value. According to the sign markings in vertex array 870: a) vertex 624 is fully materialized; b) vertex 622 is partially materialized; and c) vertex 623 is unmaterialized.

9.2 Vertex Property Change

New values of vertex colors are stored in color array 882 to selectively override the values of color array 762. If vertices have other properties, such as age (not shown), then computer 600 would have other property arrays (not shown).

Vertex array 871 provides for each vertex an offset into arrays of new values for vertex properties, such as color array 882. Within vertex array 871, an unchanged vertex is shown as having offset −0. Color array 882 (and other arrays of new values for vertex properties) does not have entries for unchanged vertices.

Version 610B also shows some redundant edges. Edges 634 and 636 are redundant edges that connect originate at one same vertex, point in a same direction, and terminate at another same vertex.

10.0 Bidirectional Properties

Figure 9:
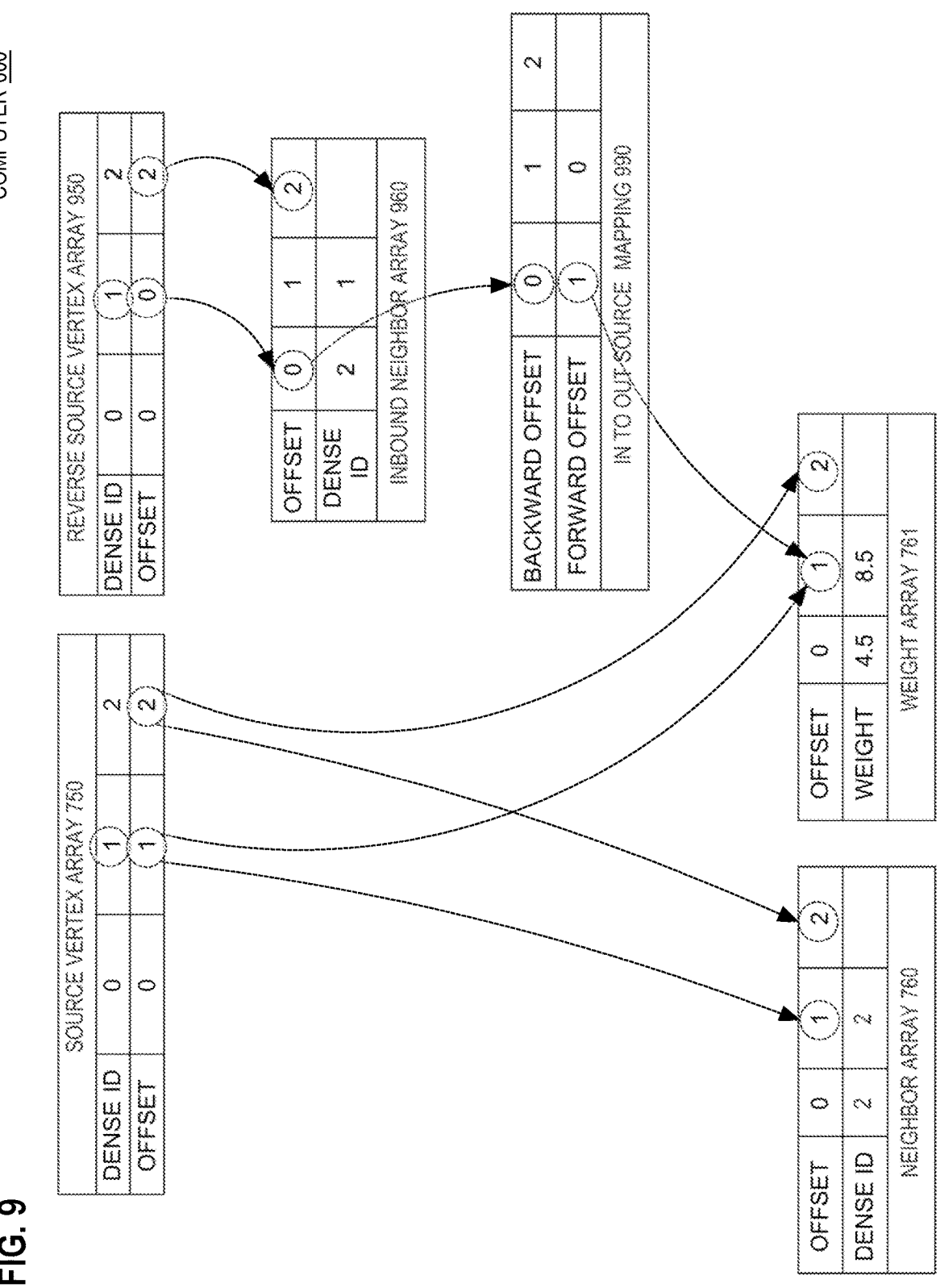
FIG. 9 is a block diagram that depicts an example computer that has a same array of edge property values regardless of whether navigation is forward or backward, in an embodiment.

FIG. 9 is a block diagram that depicts computer 600 again. Computer 600 has a same array of changed edge property values regardless of whether navigation is forward or backward.

Navigation data structures 950 and 960 are similar to navigation data structures 550 and 560. That is, data structures 950 and 960 support backward navigation of version 610A.

Weight array 761 contains a weight for each edge of version 610A. However, weight array 761 is designed for use during forward navigation, not backward.

That is because source vertex array 750 provides offsets into weight array 761, and source vertex array 750 only supports forward navigation (whereas reverse source vertex array 950 supports backward navigation). A naïve implementation may introduce a reverse weight array (not shown) for use with reverse source vertex array 950 for backward navigation.

However, a reverse weight array would duplicate the same weights as are stored in weight array 761, but reordered. Thus, reverse arrays would double the memory needed for edge properties.

That would be problematic because edge (and vertex) properties may be numerous, and their values may be large. Likewise, edges are likely to be more numerous than vertices, perhaps by a few orders of magnitude.

Thus, edge property values may together consume more memory than all of the other details of a graph. Naively doubling that consumption for reverse edge property arrays would be wasteful.

10.1 In to Out Source Mapping

Thus, computer 600 populates and uses in to out source mapping 990, which maps an offset within inbound neighbor array 960 to an offset for use in weight array 761. For example, edge 633 occurs at offset 0 in inbound neighbor array 960.

That offset 0 is mapped by in to out source mapping 990 to offset 0. Weight array 761 at offset 0 indicates that the weight of edge 633 is 8.5 in version 610A.

11.0 Bidirectional Property Changes

FIG. 10 is a block diagram that depicts computer 600 again. Computer 600 has a same array of changed edge values regardless of whether navigation is forward or backward.

Navigation data structures 1070 and 1080 are similar to navigation data structures 870 and 880. That is, data structures 1070 and 1080 support backward navigation of version 610B.

11.1 In to Out Materialized Mapping

Weight array 881 contains a weight for each edge that is changed in version 610B. However, weight array 881 is designed for use during forward navigation, not backward.

That is because vertex array 870 provides offsets into weight array 881, and vertex array 870 only supports forward navigation (whereas inbound vertex array 1070 supports backward navigation). Computer 600 populates and uses in to out materialized mapping 1090, which maps an offset within inbound materialized array 1080 to an offset for use in weight array 881. For example, edge 635 occurs at offset 0 in inbound materialized array 1080.

That offset 0 is mapped by in to out materialized mapping 1090 to offset 1. Weight array 881 at offset 1 indicates that the weight of edge 635 is 8.1 in version 610B.

12.0 Edge Identifier

Figure 11:
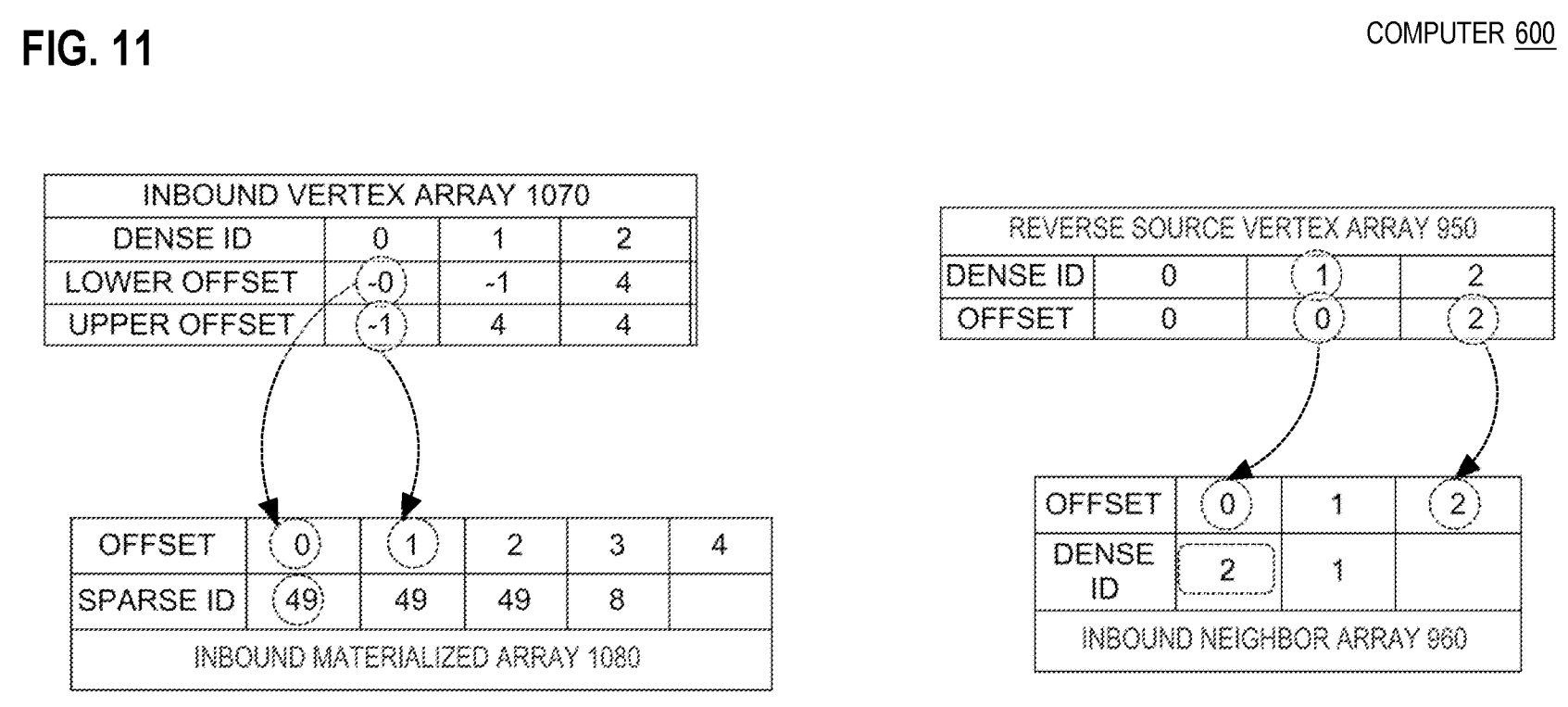

FIG. 11 is a block diagram that depicts computer 600 again. Computer 600 assigns each edge a unique integer identifier.

FIG. 11 shows navigation data structures for version 610B that are discussed elsewhere above. Each edge in version 610B may be assigned a unique identifier based on the offset of the edge within data structure 960 or 1080.

However, a same offset may occur in both of data structure 960 and 1080, such as offset 0. At offset 0 in inbound neighbor array 960 is dense identifier 2 that represents edge 633.

Whereas, at offset 0 in inbound materialized array 1080 is sparse identifier 49 that represents edge 635. To distinguish edges having a same offset but for different data structures, the high order bit or sign bit of offsets into inbound materialized array 1080 may be set depending on which data structure has the edge.

For example, edge 633 may have an integer identifier of 0. Whereas, edge 635 may have an integer identifier of −0.

Thus, computer 600 may inspect the sign bit of an integer identifier of an edge to detect whether the edge is stored in data structure 960 or 1080. Thus, computer 600 may use an integer identifier such as 0 or −0 as an offset (without sign) into data structure 960 or 1080.

13.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
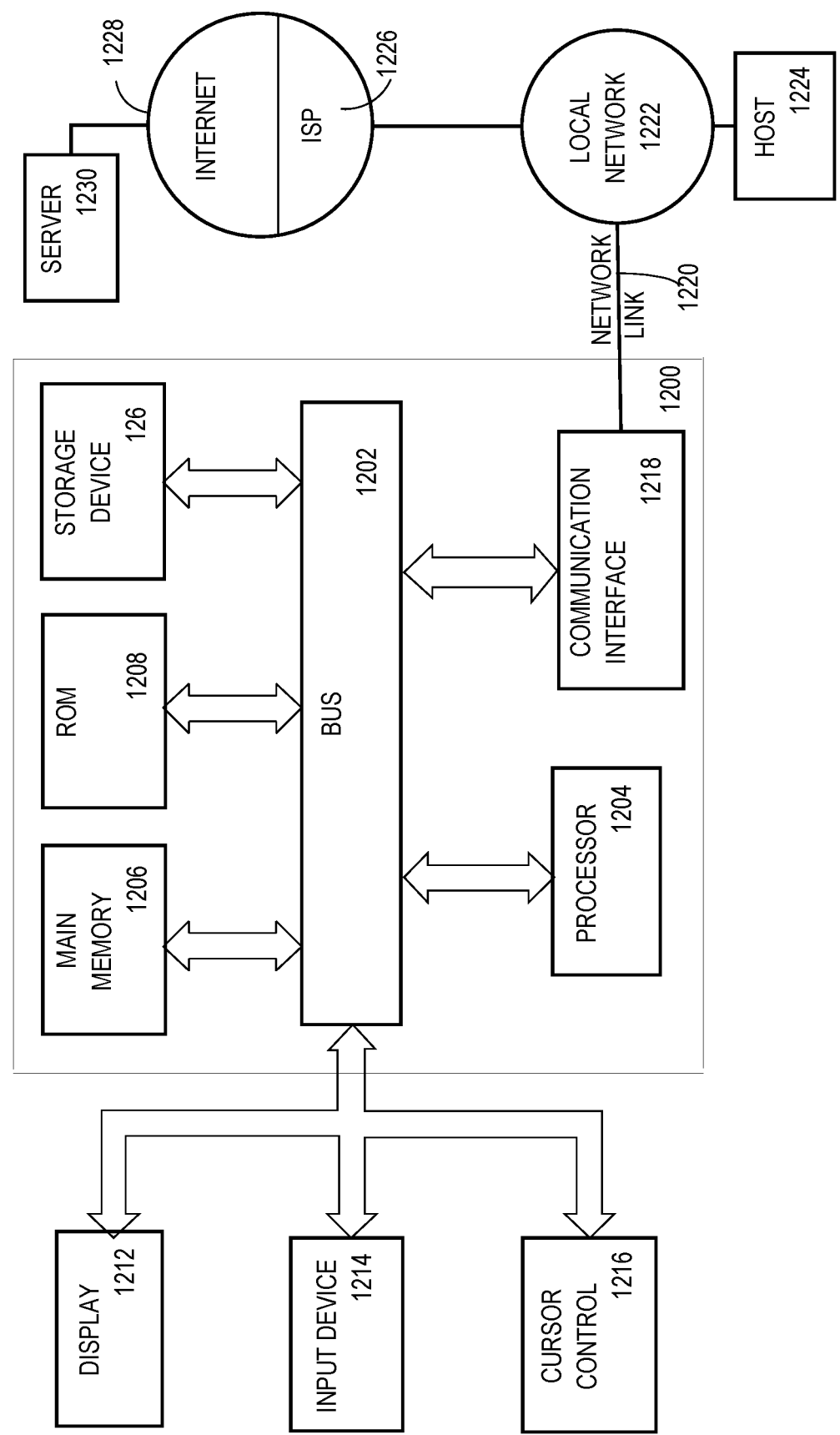
FIG. 12 is a block diagram that illustrates a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 126, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 126. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 126. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 126 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 126, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
    storing a source vertex array of vertices of a directed graph, wherein:

each vertex of the directed graph is identifiable by each of: a dense identifier comprising an offset of said each vertex within the source vertex array, and a sparse identifier; and
the directed graph contains a first vertex that has first dense identifier and a first sparse identifier;
storing a first bidirectional map that, for each vertex of the directed graph, associates the sparse identifier of said each vertex with the dense identifier of said each vertex;
cloning a second bidirectional map from the first bidirectional map;
creating a first version of the directed graph that is based on the first bidirectional map;
creating a second version of the directed graph that is based on the second bidirectional map;
executing a plurality of change descriptors that describe changes to the second version of the directed graph, including a first change descriptor that removes the first vertex from the directed graph and a second change descriptor that adds a second vertex to the directed graph, wherein the second vertex has the first dense identifier and a second sparse identifier;
updating the second bidirectional map to reflect said executing said plurality of change descriptors, including remapping the first dense identifier to the second sparse identifier;
concurrently providing access to the first version and the second version of the directed graph to one or more clients.

2. The method of claim 1 further comprising receiving, from a client of the one or more clients, a request to access a particular version of the directed graph.

3. The method of claim 1 further comprising at least one selected from the group consisting of transferring the first bidirectional map to persistent storage and transferring the first bidirectional map from persistent storage.

4. The method of claim 3 wherein:
the directed graph further comprises a plurality of edges;
the method further comprises lazily loading at least one selected from the group consisting of a non-topological property of one or more vertices and a non-topological property of one or more edges.

5. The method of claim 1 wherein:
a transaction consists essentially of the plurality of change descriptors;
said executing said plurality of change descriptors occurs when demarcation of the transaction is received.

6. The method of claim 1 further comprising publicizing dense identifiers of vertices of the directed graph to a client of the one or more clients.

7. The method of claim 1 wherein:
the directed graph further comprises a plurality of edges;
a change descriptor of the plurality of change descriptors describes changes to at least one selected from the group consisting of multiple properties of a vertex of the directed graph and multiple properties of an edge of the directed graph.

8. The method of claim 1 wherein:
a transaction of a plurality of transactions consists essentially of the plurality of change descriptors;
the method further comprises storing the plurality of change descriptors into a buffer of a plurality of buffers;
each transaction of the plurality of transactions is associated with a separate buffer of the plurality of buffers.

9. The method of claim 1 wherein said executing said plurality of change descriptors comprises:

receiving the plurality of change descriptors from the one or more clients;
receiving from a client of the one or more clients, after receiving the plurality of change descriptors, a request to start execution.

10. One or more non-transitory computer-readable media storing instructions that, when executed by one or more processors, cause:
storing a source vertex array of vertices of a directed graph, wherein:
each vertex of the directed graph is identifiable by each of: a dense identifier comprising an offset of said each within the source vertex array, and a sparse identifier; and
the directed graph contains a first vertex that has first dense identifier and a first sparse identifier;
storing a first bidirectional map that, for each vertex of the directed graph, associates the sparse identifier of said each vertex with the dense identifier of said each vertex;
cloning a second bidirectional map from the first bidirectional map;
creating a first version of the directed graph that is based on the first bidirectional map;
creating a second version of the directed graph that is based on the second bidirectional map;
executing a plurality of change descriptors that describe changes to the second version of the directed graph, including a first change descriptor that removes the first vertex from the directed graph and a second change descriptor that adds a second vertex to the directed graph, wherein the second vertex has the first dense identifier and a second sparse identifier;
updating the second bidirectional map to reflect said executing said plurality of change descriptors, including remapping the first dense identifier to the second sparse identifier;
concurrently providing access to the first version and the second version of the directed graph to one or more clients.

11. The one or more non-transitory computer-readable media of claim 10 wherein the instructions further cause receiving, from a client of the one or more clients, a request to access a particular version of the directed graph.

12. The one or more non-transitory computer-readable media of claim 10 wherein the instructions further cause at least one selected from the group consisting of transferring the first bidirectional map to persistent storage and transferring the first bidirectional map from persistent storage.

13. The one or more non-transitory computer-readable media of claim 12 wherein:
the directed graph further comprises a plurality of edges;
the instructions further cause lazily loading at least one selected from the group consisting of a non-topological property of one or more vertices and a non-topological property of one or more edges.

14. The one or more non-transitory computer-readable media of claim 10 wherein:
a transaction consists essentially of the plurality of change descriptors;
said executing said plurality of change descriptors occurs when demarcation of the transaction is received.

15. The one or more non-transitory computer-readable media of claim 10 wherein the instructions further cause publicizing dense identifiers of vertices of the directed graph to a client of the one or more clients.

16. The one or more non-transitory computer-readable media of claim 10 wherein:
    the directed graph further comprises a plurality of edges;
    a change descriptor of the plurality of change descriptors describes changes to at least one selected from the group consisting of multiple properties of a vertex of the directed graph and multiple properties of an edge of the directed graph.

17. The one or more non-transitory computer-readable media of claim 10 wherein:
    a transaction of a plurality of transactions consists essentially of the plurality of change descriptors;
    the instructions further cause storing the plurality of change descriptors into a buffer of a plurality of buffers;
    each transaction of the plurality of transactions is associated with a separate buffer of the plurality of buffers.

18. The one or more non-transitory computer-readable media of claim 10 wherein said executing said plurality of change descriptors comprises:
    receiving the plurality of change descriptors from the one or more clients;
    receiving from a client of the one or more clients, after receiving the plurality of change descriptors, a request to start execution.

19. One or more computers configured to:
    store a source vertex array of vertices of a directed graph, wherein:
        each vertex of the directed graph is identifiable by each of: a dense identifier comprising an offset of said each vertex within the source vertex array, and a sparse identifier; and
        the directed graph contains a first vertex that has first dense identifier and a first sparse identifier;
    store a first bidirectional map that, for each vertex of the directed graph, associates the sparse identifier of said each vertex with the dense identifier of said each vertex;
    clone a second bidirectional map from the first bidirectional map;
    create a first version of the directed graph that is based on the first bidirectional map;
    create a second version of the directed graph that is based on the second bidirectional map;
    execute a plurality of change descriptors that describe changes to the second version of the directed graph, including a first change descriptor that removes the first vertex from the directed graph and a second change descriptor that adds a second vertex to the directed graph, wherein the second vertex has the first dense identifier and a second sparse identifier;
    update the second bidirectional map to reflect said executing said plurality of change descriptors, including remapping the first dense identifier to the second sparse identifier;
    concurrently provide access to the first version and the second version of the directed graph to one or more clients.

20. The one or more computers of claim 19 further configured to receive, from a client of the one or more clients, a request to access a particular version of the directed graph.

* * * * *

UNITED STATES PATENT AND TRADEMARK OFFICE
CERTIFICATE OF CORRECTION

Page 1 of 1

PATENT NO. : 11,068,538 B2
APPLICATION NO. : 16/265090
DATED : July 20, 2021
INVENTOR(S) : Haubenschild et al.

It is certified that error appears in the above-identified patent and that said Letters Patent is hereby corrected as shown below:

On the Title Page

On page 2, Column 2, item (56) under Other Publications, Line 11, delete "Traveral," and insert -- Traversal, --, therefor.

On page 2, Column 2, item (56) under Other Publications, Line 34, delete "Identifer"," and insert -- Identifier", --, therefor.

On page 2, Column 2, item (56) under Other Publications, Line 36, delete "identifer," and insert -- identifier, --, therefor.

In the Claims

In Column 20, Line 14, in Claim 10, before "within" insert -- vertex --.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*